(12) United States Patent     (10) Patent No.:    US 12,561,587 B2

Wang et al.                 (45) Date of Patent:       Feb. 24, 2026

---

(54) DATA PROCESSING METHOD, ELECTRONIC DEVICE, AND STORAGE MEDIUM

(71) Applicant: Beijing Youzhuju Network Technology Co., Ltd., Beijing (CN)

(72) Inventors: Shuai Wang, Beijing (CN); Tao Li, Beijing (CN); Hangjian Yuan, Beijing (CN); Yunfeng Shi, Beijing (CN); Jian Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/087,299

(22) Filed: Mar. 21, 2025

(65) Prior Publication Data

US 2025/0217677 A1     Jul. 3, 2025

Related U.S. Application Data

(63) Continuation of application No. PCT/CN2023/119413, filed on Sep. 18, 2023.

(30) Foreign Application Priority Data

Sep. 22, 2022    (CN) .......................... 202211160802.X

(51) Int. Cl.
    *G06N 5/04*         (2023.01)
    *G06N 3/0895*     (2023.01)
(52) U.S. Cl.
    CPC ............. *G06N 5/04* (2013.01); *G06N 3/0895* (2023.01)
(58) Field of Classification Search
    None
    See application file for complete search history.

(56) References Cited

U.S. PATENT DOCUMENTS

| | | |
|---|---|---|
| 6,901,396 B1 | 5/2005 | Taylor |
| 2021/0182036 A1 | 6/2021 | Shafiq et al. |

FOREIGN PATENT DOCUMENTS

| | | |
|---|---|---|
| CN | 107423816 A | 12/2017 |
| CN | 111898698 A | 11/2020 |

(Continued)

OTHER PUBLICATIONS

Mao, Network System Optimization with Reinforcement Learning: Methods and Applications, Doctoral Thesis, Massachusetts Institute of Technology, Department of Electrical Engineering and Computer Science, Sep. 2020, pp. 1-217 (Year: 2020).*

(Continued)

*Primary Examiner* — Wilbert L Starks

(74) *Attorney, Agent, or Firm* — Astute IP Law Group

(57) ABSTRACT

A data processing method, an electronic device, and a storage medium. The data processing method is applied to a compiled neural network model, a compiled computation graph corresponding to the neural network model includes M fusion computing nodes, M is a positive integer, and the data processing method includes: packaging data in a plurality of input data groups to obtain at least one instance input data, wherein each instance input data at least includes data required by at least one of M fusion computing nodes when the neural network model executes one-time model inference; reading one instance input data of the at least one instance input data; based on the instance input data, executing an execution instruction corresponding to at least one fusion computing node, to obtain an output of the at least one fusion computing node; and outputting the output of the at least one fusion computing node.

20 Claims, 5 Drawing Sheets

(56) References Cited

FOREIGN PATENT DOCUMENTS

| | | | |
|----|--------------|----|---------|
| CN | 112465108 | A | 3/2021 |
| CN | 112686378 | A | 4/2021 |
| CN | 112711422 | A | 4/2021 |
| CN | 113420865 | A | 9/2021 |
| CN | 114580606 | A | 6/2022 |
| GB | 202016225 | | 11/2020 |
| WO | 2021248138 | A1 | 12/2021 |

OTHER PUBLICATIONS

International Search Report and Written Opinion received for PCT Patent Application No. PCT/CN2023/119413, mailed on Dec. 11, 2023, 15 pages (7 pages of English Translation and 8 pages of Original Document).
Office Action for Chinese Patent Application No. 202211160802.X, mailed on Jun. 29, 2025, 20 pages.
Extended European Search Report for European Patent Application No. 23867451.9, mailed on Sep. 22, 2025, 8 pages.

* cited by examiner

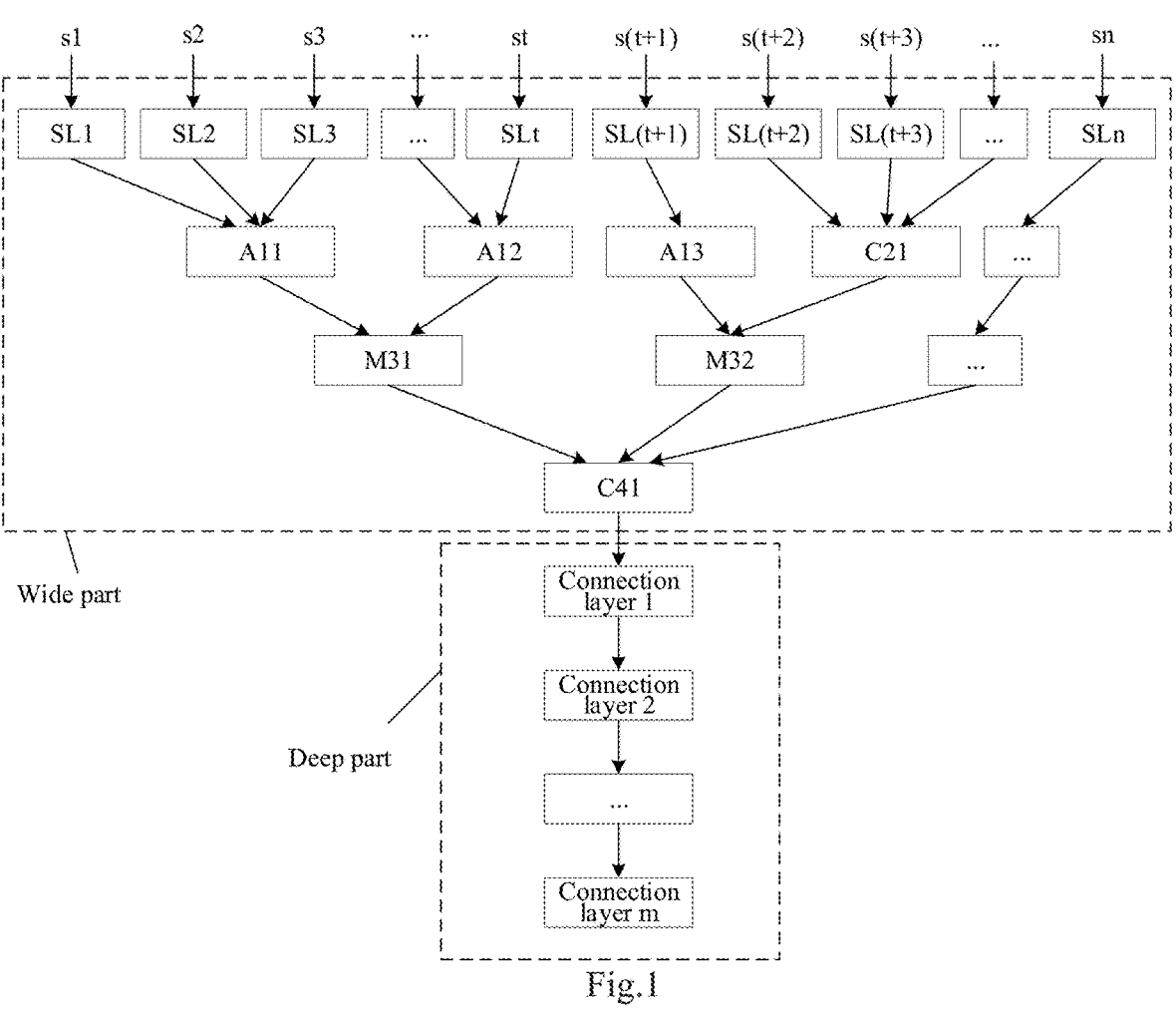

Fig.1

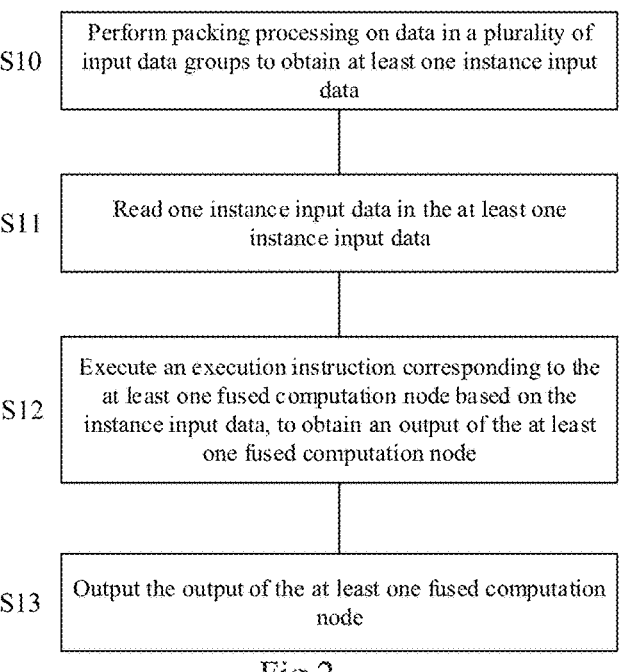

S10 | Perform packing processing on data in a plurality of input data groups to obtain at least one instance input data S11 | Read one instance input data in the at least one instance input data S12 | Execute an execution instruction corresponding to the at least one fused computation node based on the instance input data, to obtain an output of the at least one fused computation node S13 | Output the output of the at least one fused computation node

Computer-executable
instructions

Non-transitory computer
readable storage medium

70

DATA PROCESSING METHOD, ELECTRONIC DEVICE, AND STORAGE MEDIUM

CROSS REFERENCE TO RELATED APPLICATION(S)

The present application is a continuation of International Patent Application No. PCT/CN2023/119413, filed on Sep. 18, 2023, which claims priority to Chinese Patent Application No. 202211160802.X, filed on Sep. 22, 2022, which are incorporated herein by reference in their entireties as a part of the present application.

TECHNICAL FIELD

Embodiments of the present disclosure relate to a data processing method and apparatus, and a non-transitory computer-readable storage medium.

BACKGROUND

A search ranking system needs to have a memory capability and a generalization capability at the same time, that is, the search result needs to have accuracy and expansibility at the same time. A generalized linear model with non-linear feature transformation is widely used in large-scale regression and classification problems with sparse inputs and has a strong memory capability. A deep neural network can generate a better unknown feature combination through a low-dimensional dense vector learned by a sparse feature and has a strong generalization capability.

SUMMARY

This SUMMARY is provided to briefly introduce concepts, which will be described in detail in the section DETAILED DESCRIPTION OF EMBODIMENTS later. This content part is neither intended to identify key or necessary features of the technical solutions claimed, nor is it intended to be used to limit the scope of the technical solutions claimed.

At least one embodiment of the present disclosure provides a data processing method applied to a neural network model after compilation processing is performed on the neural network model. A compiled computation graph corresponding to the neural network model includes M fused computation nodes, M being a positive integer. The data processing method includes: performing packing processing on data in a plurality of input data groups to obtain at least one instance input data, wherein each instance input data includes at least data required by at least one of the M fused computation nodes when the neural network model performs model inference once; reading one instance input data in the at least one instance input data; executing an execution instruction corresponding to the at least one fused computation node based on the instance input data to obtain an output of the at least one fused computation node; and outputting the output of the at least one fused computation node.

At least one embodiment of the present disclosure further provides a data processing apparatus, including: at least one memory that stores computer-executable instructions in a non-transitory manner; and at least one processor configured to run the computer-executable instructions, wherein the computer-executable instructions, when run by the at least one processor, cause the data processing method according to any one of the embodiments of the present disclosure to be implemented.

At least one embodiment of the present disclosure further provides a non-transitory computer-readable storage medium, wherein the non-transitory computer-readable storage medium stores computer-executable instructions, and the computer-executable instructions, when executed by a processor, cause the data processing method according to any one of the embodiments of the present disclosure to be implemented.

BRIEF DESCRIPTION OF DRAWINGS

The above and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale.

FIG. 1 is a schematic diagram of a structure of a neural network model according to at least one embodiment of the present disclosure;

FIG. 2 is a schematic flowchart of a data processing method according to at least one embodiment of the present disclosure;

DETAILED DESCRIPTION

Figure 3:
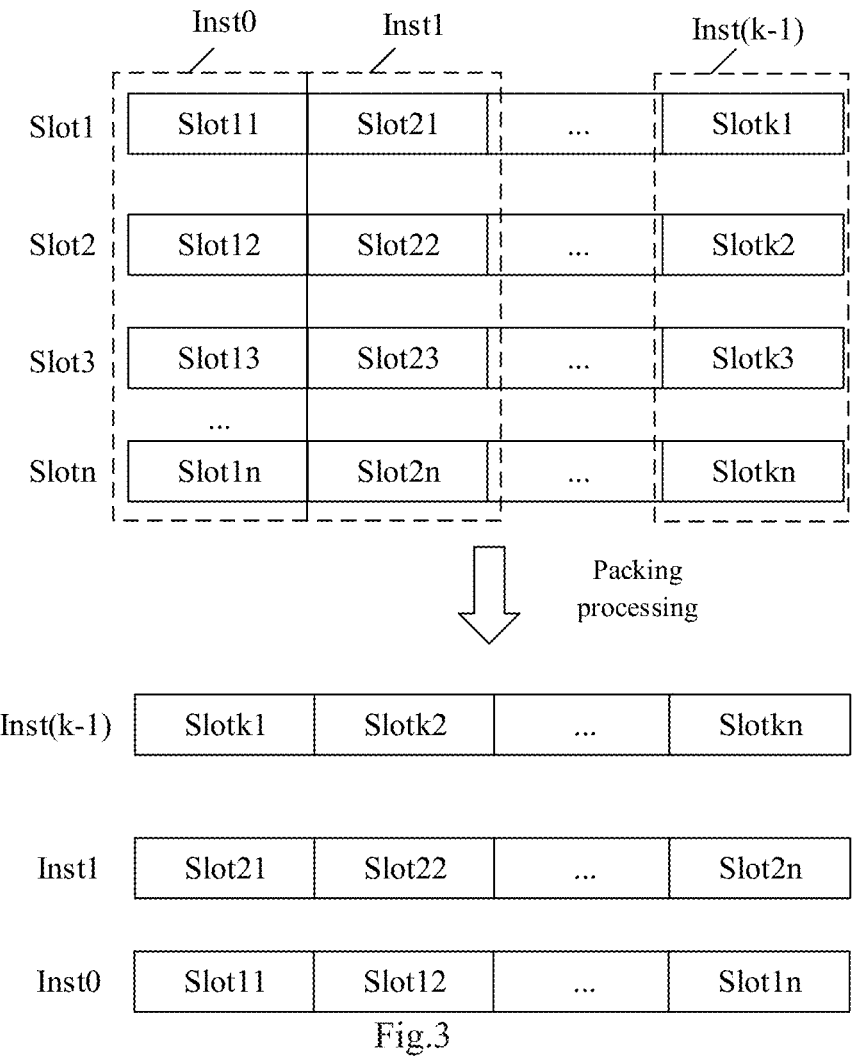
FIG. 3 is a schematic diagram of a plurality of input data groups and a plurality of instance input data according to at least one embodiment of the present disclosure.

Embodiments of the present disclosure will be described in more detail below with reference to the accompanying drawings. Although some embodiments of the present disclosure are shown in the drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the steps described in the method implementations of the present disclosure may be performed in different orders, and/or performed in parallel. In addition, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that the concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "multiple" mentioned in the present disclosure are illustrative and not restrictive, and those skilled in the art should understand that unless the context clearly indicates otherwise, it should be understood as "one or more".

Names of messages or information exchanged between a plurality of apparatuses in the implementations of the present disclosure are used for illustrative purposes only, and are not used to limit the scope of these messages or information.

FIG. 1 is a schematic diagram of a structure of a neural network model according to at least one embodiment of the present disclosure.

A deep learning network model may include a Wide & Deep network model. The Wide & Deep network model is a network model that combines a linear model and a deep neural network well, and takes into account the memory capability of the model while improving the generalization capability of the model. For example, an example of a computation graph of the Wide & Deep network model is shown in FIG. 1. The Wide & Deep network model is a mixed model composed of a Wide part and a Deep part. The Wide part is a generalized linear sparse model (for example, logistic regression), and a main role of the Wide part is to make the Wide & Deep network model have a strong "memory capability"; the Deep part is a feedforward neural network, and a main role of the Deep part is to make the Wide & Deep network model have a "generalization capability". Such a structural feature enables the Wide & Deep network model to have the advantages of both logistic regression and a deep neural network, that is, it can quickly process and remember a large number of historical behavior features, and has a strong expression capability.

The main features of the Wide & Deep network model are as follows: first, the number of inputs s (s1 to sn in FIG. 1, both t and n are positive integers, and t is less than n) of the model is large, for example, about 500; second, the amount of data of a single input s is small, for example, the amount of data of each input s is in a range of 2 bytes (Byte) to 128 bytes; third, due to factors such as a hardware storage structure, a single input s is not 64-channel aligned; fourth, for the Wide part, the number of operators is large (for example, each input s corresponds to one selection node, so that the number of selection nodes SL1 to SLn is the same as the number of inputs s, about 500), the types of operators are various, and the computing power is small; fifth, for the Deep part, the number of parameters of a single general matrix multiplication (General Matrix Multiplication, GEMM) operation is large, and the calculation is heavy, but the utilization rate of a matrix operation unit is low.

If a central processing unit (CPU), a graphics processing unit (GPU), a domain-specific accelerator (DSA), or other processors are used to perform an inference calculation process of the Wide & Deep network model, the Wide & Deep network model needs to be compiled and optimized for different target hardware, and then can be efficiently run on the target hardware. Compared with the CPU, the industry mainly uses a hardware accelerator such as a GPU or another artificial intelligence (AI) DSA to accelerate the execution of the calculation process of the model. However, since the Wide & Deep network model has a complex model structure, the running time of the Wide & Deep network model on the GPU is not significantly reduced compared with the running time of the Wide & Deep network model on the CPU, and the main reason is caused by the structure of the Wide part of the Wide & Deep network model. Each operator of the Wide part requires a small amount of computation, but there are a large number of operators. Since each operator needs to execute a launch kernel before being executed, the overhead of this part accounts for a relatively large proportion.

For a hardware accelerator such as a GPU and a DSA, since the Wide & Deep network model has a complex model structure, the hardware accelerator such as the GPU and the DSA has the following problems, so that its advantages cannot be effectively exerted. The specific problems are as follows:

First, the reading efficiency of the input s is low. On the one hand, there are a large number of inputs s. On the other hand, the amount of data of each input s is relatively small, for example, about 100 Bytes, and the position of each input s in the memory/video memory is also relatively discrete. Such multiple, small-data-volume, and discrete data access may result in a reducing the efficiency of hardware data access. Compared with this data access mode, the hardware is better at reading a large amount of data at a time and reducing the number of reads.

Second, the execution efficiency of the Wide part is low. On the one hand, the number of operators of the Wide part is large, and the amount of computation of each operator is small. On the other hand, when a hardware accelerator such as a GPU and a DSA executes an operator, the hardware accelerator needs to first configure the operator, and then perform a calculation corresponding to the operator. In the case that the operator has this characteristic, the execution manner of the hardware accelerator may result in a large proportion of the configuration time and the calculation time of the operator in the actual execution process, a significant reduction in the calculation efficiency, and an increase in the overall running time.

At least one embodiment of the present disclosure provides a data processing method, applied to a neural network model after compilation processing is performed on the neural network model. A compiled computation graph corresponding to the neural network model includes M fused computation nodes, M being a positive integer. The data processing method includes: performing packing processing on data in a plurality of input data groups to obtain at least one instance input data, wherein each instance input data includes at least data required by at least one of the M fused computation nodes when the neural network model performs model inference once; reading one instance input data in the at least one instance input data; executing an execution instruction corresponding to the at least one fused computation node based on the instance input data to obtain an output of the at least one fused computation node; and outputting the output of the at least one fused computation node.

The data processing method provided in this embodiment of the present disclosure implements graph compilation optimization of the neural network model. By performing packing processing on the input data groups to obtain the instance input data, the hardware can carry the instance input data at a time, so that a large amount of data is carried at a time, thereby reducing the configuration overhead caused by multiple data carrying. Therefore, the efficiency of the hardware in reading data can be improved, the utilization rate of the calculation module can be increased, and the calculation time can be reduced.

At least one embodiment of the present disclosure further provides a data processing apparatus and a non-transitory computer-readable storage medium. The data processing method may be applied to the data processing apparatus provided in the embodiments of the present disclosure, and the data processing apparatus may be configured on an electronic device. The electronic device may be a personal computer, a mobile terminal, or the like, and the mobile terminal may be a hardware device such as a mobile phone or a tablet computer.

Embodiments of the present disclosure are described in detail below with reference to the accompanying drawings, but the present disclosure is not limited to these specific embodiments. In order to keep the following description of the embodiments of the present disclosure clear and concise, detailed descriptions of some known functions and known parts are omitted in the present disclosure.

FIG. 2 is a schematic flowchart of a data processing method according to at least one embodiment of the present disclosure, and FIG. 3 is a schematic diagram of a plurality of input data groups and a plurality of instance input data according to at least one embodiment of the present disclosure.

The data processing method provided in the embodiments of the present disclosure may be applied to a neural network model on which the compilation processing has been performed. For example, the neural network model may be used to implement convolution operations, matrix operations, and the like. For example, the compilation processing may be graph compilation processing.

For example, the neural network model may include a plurality of inputs, the number of the plurality of inputs is greater than a predetermined threshold, and the predetermined threshold may be set according to the actual situation. For example, the predetermined threshold may be 400, 500, or the like. In other words, the neural network model has a large number of inputs. For example, in some embodiments, the neural network model may be a Wide & Deep network model, and a computation graph of the neural network model before compilation processing is performed is shown in FIG. 1. As shown in FIG. 1, s1 to sn represent inputs of the neural network model. The Wide part may include a plurality of nodes (for example, SL1 to SLn, A11 to A13, C21, M31 to M32, and C41), the Wide part is configured to receive the inputs s1 to sn, and the Deep part may include a plurality of connection layers 1 to connection layers m that are sequentially connected, m may be a positive integer, and a specific value of m may be set according to an actual model structure, which is not limited in the present disclosure. The connection layers 1 to the connection layers m may be fully connected layers.

It should be noted that a specific structure of the neural network model is not limited to the structure shown in FIG. 1, and the specific structure of the neural network model may be set according to the actual situation.

For example, a compiled computation graph corresponding to the neural network model includes M fused computation nodes, M being a positive integer. For example, M may be greater than 1. It should be noted that the M fused computation nodes may be all fused computation nodes in the compiled computation graph or may be some fused computation nodes in the compiled computation graph.

As shown in FIG. 2, in some embodiments of the present disclosure, the data processing method may include the following steps S10 to S13.

Step S10: Performing packing processing on data in a plurality of input data groups to obtain at least one instance input data.

Step S11: Reading one instance input data in the at least one instance input data.

Step S12: Executing an execution instruction corresponding to the at least one fused computation node based on the instance input data to obtain an output of the at least one fused computation node.

Step S13: Outputting the output of the at least one fused computation node.

For example, in step S10, each instance input data includes at least data required by at least one of the M fused computation nodes when the neural network model performs model inference once. In some embodiments, each instance input data includes all data required when the neural network model performs model inference once. Unless otherwise specified, the following description is made by using an example in which each instance input data includes all data required when the neural network model performs model inference once.

It should be noted that in the embodiments of the present disclosure, "performing model inference once" may represent, for example, an image recognition process, an item (for example, an article) recognition process, and the like.

For example, in step S10, each input data group includes a plurality of input data segments, and the plurality of input data segments respectively correspond to a plurality of times of model inference performed by the neural network model. Each input data segment may include at least one piece of data, one piece of data represents one floating-point number or integer, and the data may represent information such as a city, a region, a commodity, or the like, which may be understood as corresponding a string to a number (0, 1, etc.). For example, a specific string may correspond to 1, and another string may correspond to 0. For example, the amount of data of the instance input data is greater than the amount of data of any input data segment in the input data group.

For example, the plurality of input data segments may respectively correspond to different amounts of data or may correspond to at least partially same amounts of data.

For example, in some embodiments, FIG. 3 shows n input data groups Slot1 to Slotn. The input data group Slot1 represents data corresponding to the input s1 in the neural network model shown in FIG. 1, the input data group Slot2 represents data corresponding to the input s2 in the neural network model shown in FIG. 1, and so on, and the input data group Slotn represents data corresponding to the input sn in the neural network model shown in FIG. 1. Each input data group includes k input data segments. For example, the input data group Slot1 may include an input data segment Slot11, an input data segment Slot21, . . . , and an input data segment Slotk1.

For example, each input data segment corresponds to model inference performed by the neural network model once, that is, each input data segment is data corresponding to one input of the neural network model when the neural network model performs model inference once. For example, the input data segment Slot11 is data corresponding to the input s1 when the neural network model performs first model inference, the input data segment Slot21 is data corresponding to the input s1 when the neural network model performs second model inference, and the first model inference and the second model inference are two different times of model inference.

For example, on a host end, the plurality of input data segments in each input data group are stored continuously in a memory of the host end. As shown in FIG. 3, the input data segment Slot11, the input data segment Slot21, . . . , and the input data segment Slotk1 in the input data group Slot1 are stored continuously in the memory of the host end, for example, stored in a same row. "Stored continuously" may represent that storage addresses of a plurality of pieces of data are continuous.

It should be noted that the arrangement manner of the input data segments in the plurality of input data groups shown in FIG. 3 is merely schematic, and the arrangement manner of the input data segments in the plurality of input data groups is not limited thereto and may be set according to the actual application requirements.

In the example shown in FIG. 3, each instance input data Inst(Inst0, Inst1, . . . , and Inst(k−1)) represents all data required for performing model inference once, that is, data of all inputs s1 to sn of the neural network model shown in FIG. 1.

For example, each instance input data includes a plurality of instance data segments, and the plurality of instance data segments correspond to the same time of model inference, that is, the plurality of instance data segments are data required for the same time of model inference. The plurality of instance data segments are in a one-to-one correspondence with the plurality of input data groups, and each instance data segment is one input data segment in the corresponding input data group. For example, as shown in FIG. 3, the instance input data Inst0 includes the input data segment Slot11 in the input data group Slot1, the input data segment Slot12 in the input data group Slot2, the input data segment Slot13 in the input data group Slot3, . . . , and the input data segment Slot In in the input data group Slotn. Similarly, the instance input data Inst1 includes the input data segment Slot21 in the input data group Slot1, the input data segment Slot22 in the input data group Slot2, the input data segment Slot23 in the input data group Slot3, . . . , and the input data segment Slot2n in the input data group Slotn. By analogy, the instance input data Inst(k−1) includes the input data segment Slotk1 in the input data group Slot1, the input data segment Slotk2 in the input data group Slot2, the input data segment Slotk3 in the input data group Slot3, . . . , and the input data segment Slotkn in the input data group Slotn.

For example, in some embodiments, the plurality of instance data segments in each instance input data are stored continuously. For example, as shown in FIG. 3, the plurality of instance data segments Slot11 to Slot1n in the instance input data Inst0 are stored continuously in the memory of the host end, for example, stored in a same row.

For example, in some embodiments, the at least one instance input data includes a plurality of instance input data, and the plurality of instance input data are stored and arranged continuously, for example, stored in a plurality of consecutive rows. For example, FIG. 3 shows k instance input data Inst0 to Inst(k−1), and the k instance input data Inst0 to Inst(k−1) are stored continuously in the memory of the host end.

For example, the hardware may calculate the plurality of instance input data Inst at a time, and the plurality of instance input data Inst are referred to as one batch, and a batch size represents the number of instance input data Inst calculated by the hardware at a time of batch operation. As shown in FIG. 3, the batch size=k, that is, the hardware calculates the k instance input data Inst at a time.

In order to give full play to the operators and reduce the number of data carrying, the batch operation needs to be performed. After the batch operation, the plurality of instance input data Inst in the same batch may be carried at a time, thereby further reducing the number of data carrying.

In the data processing method provided in the embodiments of the present disclosure, since the packing processing is performed, a memory copy (representing data movement performed to change an arrangement manner of data in a memory) operation does not need to be performed on the instance input data Inst when data is carried, thereby further saving the specific operation process of the data carrying operation and saving the time of data carrying.

For example, in some embodiments, the plurality of input data groups may be data of the same batch.

For example, in step S10, the packing processing may be performed on a host end. As shown in FIG. 3, on the host end, the data in the n input data groups is packed to obtain k instance input data. In this embodiment of the present disclosure, the packing processing is performed on the host end to adjust an arrangement manner of input data input to the neural network model, so that the data input to the neural network model is closely arranged in a manner of the plurality of instance input data, thereby facilitating a subsequent data carrying process, reducing the number of data carrying, and saving the time of data carrying.

For example, the plurality of instance data segments in the instance input data after packing need to be arranged in a specific order. As shown in FIG. 3, after the packing processing, the instance input data Inst0 includes n instance data segments, and the n instance data segments are respectively an input data segment Slot11, an input data segment Slot12, an input data segment Slot13, . . . , and an input data segment Slot In that are arranged in sequence.

It should be noted that the above "order" may represent an order arranged from small to large according to labels of input data segments corresponding to the instance data segments. For example, 11 in the Slot11, 12 in the Slot12, and the like shown in FIG. 3 may represent labels of the input data segments. In the instance input data Inst0, the plurality of instance data segments are arranged in an order arranged from small to large according to the labels of the input data segments corresponding to the instance data segments. In step S10, first, one input data segment corresponding to the same time of model inference is obtained from each input data group as one instance data segment, to obtain the plurality of instance data segments; and then, the plurality of instance data segments are packed to obtain one instance input data. The instance input data may be all data required for the above model inference. For example, in an embodiment, the input data segment Slot11, the input data segment Slot12, the input data segment Slot13, . . . , and the input data segment Slot In are data required for the same time of model inference, so that the input data segment Slot11 may be selected from the input data group Slot1, the input data segment Slot12 may be selected from the input data group Slot2, the input data segment Slot13 may be selected from the input data group Slot3, . . . , and the input data segment Slot In may be selected from the input data group Slotn. Then, the input data segment Slot11, the input data segment Slot12, the input data segment Slot13, . . . , and the input data segment Slot In are packed to obtain the instance input data Inst0.

For example, the packing processing may include: sorting the plurality of instance data segments in a specific order, and recording a start position and an end position of each instance data segment. Since the start position and the end position of each instance data segment are recorded in the packing process, each instance data segment in the instance input data can be determined simply and conveniently. After the instance input data is input to the neural network model, the instance data segments in the instance input data can be simply and quickly corresponded to the inputs s in the neural network model.

For example, in some embodiments, step S11 may include: carrying the at least one instance input data from a memory of a host end to a memory of a device end at the same time; and reading the instance input data from the memory of the device end, and writing the instance input data into a memory of a calculation unit that executes the at least one fused computation node.

For example, as shown in FIG. 3, the packed k instance input data may be carried from the host end to the memory (for example, a double data rate synchronous dynamic random-access memory (DDR SDRAM)) of the device end at a time.

In the data processing method provided in the embodiments of the present disclosure, the plurality of instance input data may be carried from the host end to the device end at the same time. A large amount of data is carried at a time, so that the time of data carrying from the host end to the device end can be reduced, the efficiency of data carrying can be improved, the configuration overhead caused by multiple data carrying can be reduced, and the process of data carrying can be more adapted to a working process of the hardware.

For example, in step S11, reading the instance input data from the memory of the device end and writing the instance input data into the memory of the calculation unit that executes the at least one fused computation node may include: reading the instance input data from the memory of the device end and writing the instance input data into a buffer (for example, a static random-access memory (SRAM)) of the calculation unit that executes the at least one fused computation node; and reading the instance input data from the buffer, and writing the instance input data into a memory inside the calculation unit.

For example, the calculation unit may be a hardware calculation unit, that is, may be implemented based on a hardware circuit.

In step S12, since the instance input data includes all data required by the at least one fused computation node, when the calculation of the at least one fused computation node is performed, a data carrying process of carrying one instance input data from the memory of the device end to the memory of the calculation unit may be performed only once, instead of performing a data carrying process each time the calculation of each fused computation node is performed, thereby reducing the number of data carrying and saving the overall running time.

In step S13, an output of the at least one fused computation node may be stored in the buffer of the calculation unit. It should be noted that the embodiments of the present disclosure are not limited thereto, and the output of the at least one fused computation node may be stored in another place or the output of the at least one fused computation node may be output to another calculation unit or the like according to the actual application requirements.

In steps S11 to S13, at a calculation level, that is, a hardware execution solution, first, all instance data segments of one instance input data are stored and arranged continuously in a hardware memory (DDR SDRAM or a high bandwidth memory (HBM)); the one instance input data is carried from the hardware memory to a buffer corresponding to a hardware calculation unit (used to execute an execution instruction corresponding to the fused computation node); the hardware calculation unit fetches the complete instance input data from the buffer to a memory inside the hardware calculation unit; the hardware calculation unit executes an execution instruction corresponding to the corresponding fused computation node that is generated in advance by software compilation, to calculate and obtain a result corresponding to the fused computation node; and the hardware calculation unit outputs the result corresponding to the fused computation node into the buffer, thereby completing a calculation process corresponding to the fused computation node.

For example, the host end may include a CPU, and the device end may include a GPU, an AI accelerator, or the like.

A process of compilation processing performed on the neural network model is briefly described below. The compilation processing may perform compilation optimization on the neural network model through an operator fusion compilation technology. Briefly, the purpose of the operator fusion compilation technology is to fuse several operators (that is, nodes) in an initial computation graph of the neural network model into one operator, thereby reducing the configuration overhead caused by the hardware to start the operators.

For example, in some embodiments, the compilation processing includes: obtaining an initial computation graph corresponding to the neural network model; determining M groups of nodes to be fused based on the initial computation graph and a data flow direction; performing operator fusion on the M groups of nodes to be fused respectively, to obtain M fused computation nodes and M calculation fusion parameters respectively corresponding to the M fused computation nodes; and generating execution instructions corresponding to the M fused computation nodes based on the M calculation fusion parameters.

In the data processing method provided in the embodiments of the present disclosure, based on the operator fusion compilation technology, a plurality of operators (for example, selection nodes and/or calculation nodes) are fused at a graph level into one fused operator (that is, a fused computation node), so that a plurality of launch kernels for the plurality of operators can be optimized into one launch kernel for one fused operator, thereby saving the time of the launch kernel, reducing the configuration overhead caused by the hardware to execute the operators for a plurality of times, improving the execution efficiency of the hardware calculation unit, and reducing the overall running time.

FIG. 1 is an initial computation graph corresponding to a neural network model. For example, as shown in FIG. 1, before the compilation processing is performed, a Wide part of a computation graph (that is, an initial computation graph) corresponding to the neural network model includes a plurality of selection nodes SL1 to SLn and a plurality of calculation nodes A11 to A13, C21, M31 to M32, and C41. For example, the plurality of selection nodes SL1 to SLn are in a one-to-one correspondence with the plurality of inputs s1 to sn. For example, the input s1 corresponds to the selection node SL1, the input st corresponds to the selection node SLt, and so on. The calculation nodes A11 to A13 represent calculation nodes that perform the same type of calculation operation; the calculation nodes C21 and C41 represent calculation nodes that perform the same type of calculation operation; and the calculation nodes M31 to M32 represent calculation nodes that perform the same type of calculation operation. Calculation operations corresponding to the calculation nodes A11 to A13, calculation operations corresponding to the calculation nodes C21 and C41, and calculation operations corresponding to the calculation nodes M31 to M32 may be different.

For example, each calculation node may have at least one input. For example, as shown in FIG. 1, the calculation node A11 may receive outputs of three selection nodes (that is, SL1 to SL3) as inputs, the calculation node A13 may receive an output of one selection node (that is, SL (t+1)) as an input, and the calculation node M31 may receive outputs of two calculation nodes (that is, A11 and A12) as inputs.

For example, each group of nodes to be fused includes at least one selection node and at least one calculation node. For each fused computation node, the fused computation node is a node obtained by performing operator fusion on the at least one selection node and the at least one calculation node in one group of nodes to be fused.

Figure 4:
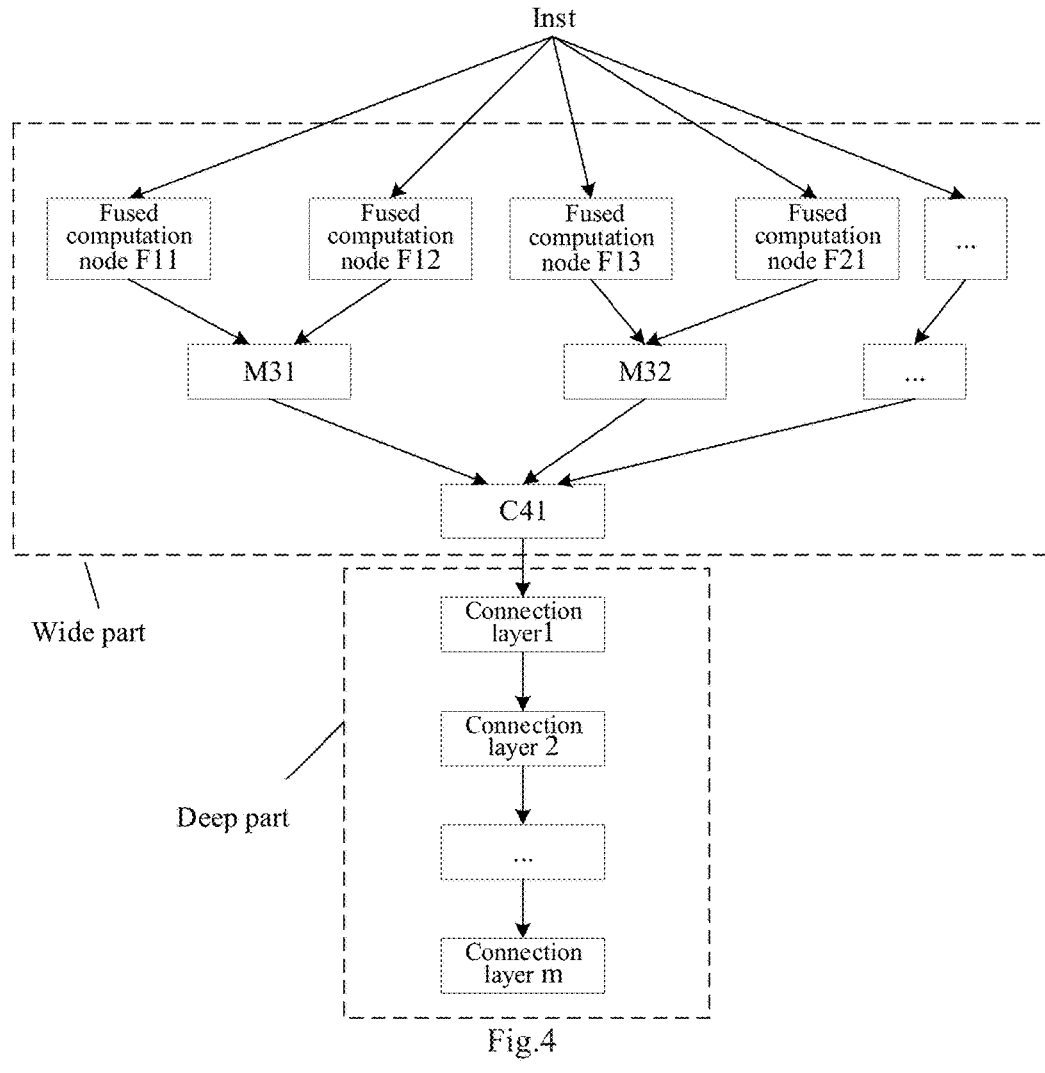
FIG. 4 is a schematic diagram of a compiled computation graph of a neural network model according to at least one embodiment of the present disclosure.

FIG. 4 is a schematic diagram of a compiled computation graph of a neural network model according to at least one embodiment of the present disclosure. The compiled computation graph shown in FIG. 4 is a computation graph obtained after compilation processing is performed on an initial computation graph of the neural network model shown in FIG. 1. It should be noted that a Deep part in FIG. 4 is the same as the Deep part in FIG. 1, and will not be described again.

For example, as shown in FIG. 1 and FIG. 4, the calculation node A11 and the plurality of corresponding selection nodes SL1 to SL3 belong to one group of nodes to be fused, so that the calculation node A11 and the plurality of corresponding selection nodes SL1 to SL3 are fused into one fused computation node F11; similarly, the calculation node A11 and the plurality of corresponding selection nodes (such as SLt) are fused into one fused computation node F12; the calculation node A13 and the corresponding selection node SL (t+1) are fused into one fused computation node F13; and the calculation node C21 and the corresponding selection nodes (such as SL (t+2) and SL (t+3)) are fused into one fused computation node F21.

In the embodiments of the present disclosure, the operator fusion involves not only vertical fusion, for example, fusion between two nodes having an input-output relationship (for example, the selection node SL1 and the calculation node A11 that receives an output of the selection node SL1 shown in FIG. 1), but also horizontal fusion, for example, fusion between a plurality of nodes that do not have an input-output relationship (for example, the plurality of selection nodes SL1 to SL3 shown in FIG. 1).

For example, each fused computation node may be configured to implement N selection operations and at least one calculation operation, where N is a positive integer. Each calculation operation is configured to perform calculating on a result of at least one selection operation.

For example, the N selection operations and/or the at least one selection operation are independent of each other.

For example, each calculation operation includes one or more of an addition calculation, a subtraction calculation, a multiplication calculation, a division calculation, and a fully connected calculation. For example, in the example shown in FIG. 1, the calculation nodes A11 to A13 may implement an addition calculation, the calculation nodes C21 and C41 may implement a fully connected calculation, and the calculation nodes M31 to M32 may implement a multiplication calculation.

For example, each calculation node in each group of nodes to be fused receives an output of one or more selection nodes in the group of nodes to be fused and calculates the output of the one or more selection nodes. In some embodiments, outputs of the at least one selection node in each group of nodes to be fused have a same size. In other words, the calculation node in each group of nodes to be fused is configured to perform calculating on an output of the at least one selection node having the same output size. For example, the calculation nodes A11 to A13 may represent adding outputs of a plurality of selection nodes having the same output size and then outputting a sum. For the calculation node A11, the calculation node A11 may receive an output of the selection node SL1, an output of the selection node SL2, and an output of the selection node SL3, and add the output of the selection node SL1, the output of the selection node SL2, and the output of the selection node SL3, to obtain an output of the calculation node A11. In this example, the output of the selection node SL1, the output of the selection node SL2, and the output of the selection node SL3 have a same size. For example, the output of the selection node SL1, the output of the selection node SL2, and the output of the selection node SL3 are each 5 bytes.

For example, the N selection operations are in a one-to-one correspondence with N data segments in the plurality of data segments in the instance input data, and each selection operation represents selecting at least some data from a data segment corresponding to the selection operation as an output of the selection node.

For example, each selection node is configured to perform one selection operation, and each calculation node is configured to perform one calculation operation. An operation implemented by each fused computation node is related to operations implemented by nodes used for fusion to obtain the fused computation node. As shown in FIG. 1 and FIG. 4, since the fused computation node F11 is obtained by performing operator fusion on the calculation node A11 and the three corresponding selection nodes SL1 to SL3, the fused computation node F11 may be configured to implement three selection operations and one calculation operation, that is, the fused computation node F11 may implement one calculation operation implemented by the calculation node A11 and the three selection operations implemented by the three selection nodes SL1 to SL3. For example, the calculation node A11 may implement an addition calculation, the selection node SL1 may implement a selection operation of selecting some data from the input s1, the selection node SL2 may implement a selection operation of selecting some data from the input s2, and the selection node SL3 may implement a selection operation of selecting some data from the input s3. In this case, the fused computation node F11 may implement an addition calculation and three selection operations, and the three selection operations are respectively a selection operation of selecting some data from the input s1, a selection operation of selecting some data from the input s2, and a selection operation of selecting some data from the input s3, and are independent of each other.

For example, performing operator fusion on the at least one group of nodes to be fused respectively to obtain the at least one fused computation node and the at least one calculation fusion parameter respectively corresponding to the at least one fused computation node includes: for each group of nodes to be fused: performing operator fusion on the at least one selection node and the at least one calculation node to obtain a fused computation node corresponding to the group of nodes to be fused; and recording node information corresponding to the at least one selection node and node information corresponding to the at least one calculation node respectively to obtain a calculation fusion parameter corresponding to the fused computation node.

For example, each fused computation node corresponds to one calculation fusion parameter, and the calculation fusion parameter includes node information corresponding to the at least one selection node used for fusion to obtain the fused computation node and node information corresponding to the at least one calculation node used for fusion to obtain the fused computation node.

For example, the node information corresponding to the at least one selection node is stored in a hash mapping manner. For example, a hash table (HashMap) may be used to store different key-value data pairs in a hash mapping manner, a key represents a selection node, and a value corresponds to node information of the selection node.

For example, the node information corresponding to the at least one calculation node may also be stored in a hash mapping manner.

For example, node information corresponding to each selection node includes a selection start position, a data selection interval number, and a number of selected data. For example, the node information of the selection node may be represented as: {start, size, stride}, where start represents the selection start position, stride represents the data selection interval number, and size represents the number of selected data. In other words, it represents that starting from the position start, data is fetched every stride, and size pieces of data are fetched (one piece of data represents one floating-point number or integer). The stride represents the number of spaced data, and stride=1 represents that data is read continuously, and stride=2 represents that one piece of data is skipped in the middle. Based on a data type, an address for each data fetch may be determined. For example, if the data is of a float32 type, stride=1 represents that the address is increased by 4 Byte (bytes) for each data fetch.

For example, in some embodiments, the compilation processing further includes: generating, based on the data flow direction, the M fused computation nodes, and unfused nodes in the initial computation graph, a compiled computation graph corresponding to the neural network model. For example, the unfused nodes are nodes other than the nodes in the M groups of nodes to be fused in the initial computation graph.

For example, as shown in FIG. 1 and FIG. 4, an input of the neural network model changes from the plurality of inputs s1 to sn to one instance input data Inst. When data is carried, data required by the plurality of inputs s1 to sn (that is, one instance input data Inst) can be carried from the host end to the device end at a time, thereby saving the time of data carrying and improving efficiency. It should be noted that in some embodiments, the instance input data may include only data required by the fused computation node F11 when the neural network model performs model inference once, or the instance input data may include only data required by the fused computation nodes F11 and F12 when the neural network model performs model inference once. The present disclosure is not specifically limited thereto.

Taking that the fused computation node in the neural network model is executed on DSA hardware as an example, a specific implementation process of operator fusion is described below with reference to FIG. 5A and FIG. 5B.

Figure 5A:
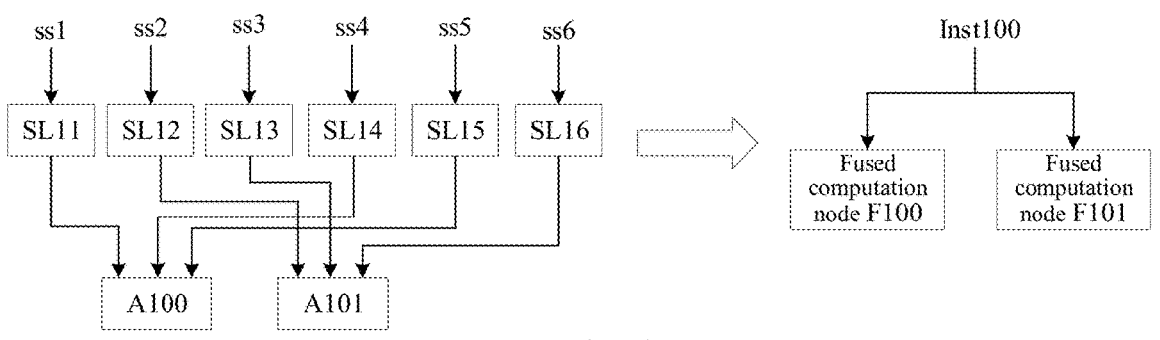
FIG. 5A is a schematic diagram of a process of performing operator fusion according to at least one embodiment of the present disclosure.

As shown in FIG. 5A, in some embodiments, before the operator fusion is performed, the neural network model may include six inputs ss1 to ss6, six selection nodes SL11 to SL16, a calculation node A100, and a calculation node A101, the calculation node A100 receives outputs of the selection node SL11, the selection node SL14, and the selection node SL15, and the calculation node A101 receives outputs of the selection node SL12, the selection node SL13, and the selection node SL16. When the compilation processing is performed, the calculation node A100, the selection node SL11, the selection node SL14, and the selection node SL15 are used as one group of nodes to be fused, and the calculation node A101, the selection node SL12, the selection node SL13, and the selection node SL16 are used as one group of nodes to be fused. After the operator fusion is performed on the calculation node A100, the selection node SL11, the selection node SL14, and the selection node SL15, a fused computation node F100 may be obtained. After the operator fusion is performed on the calculation node A101, the selection node SL12, the selection node SL13, and the selection node SL16, a fused computation node F101 may be obtained.

Figure 5B:
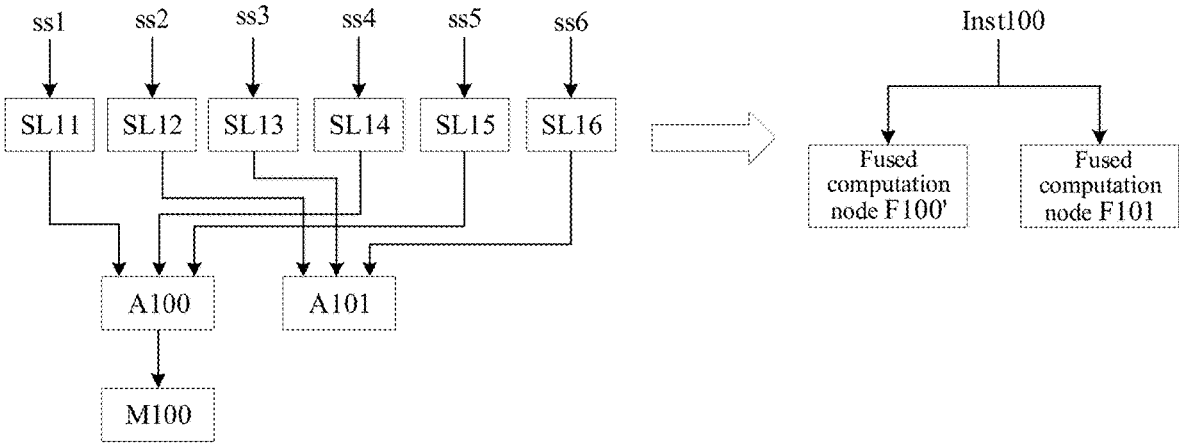
FIG. 5B is another schematic diagram of a process of performing operator fusion according to at least one embodiment of the present disclosure.

As shown in FIG. 5B, in some embodiments, before the operator fusion is performed, the neural network model may include six inputs ss1 to ss6, six selection nodes SL11 to SL16, a calculation node A100, a calculation node A101, and a calculation node M100, the calculation node A100 receives outputs of the selection node SL11, the selection node SL14, and the selection node SL15, the calculation node M100 receives an output of the calculation node A100, and the calculation node A101 receives outputs of the selection node SL12, the selection node SL13, and the selection node SL16. When the compilation processing is performed, the calculation node A100, the calculation node M100, the selection node SL11, the selection node SL14, and the selection node SL15 are used as one group of nodes to be fused, and the calculation node A101, the selection node SL12, the selection node SL13, and the selection node SL16 are used as one group of nodes to be fused. After the operator fusion is performed on the calculation node A100, the calculation node M100, the selection node SL11, the selection node SL14, and the selection node SL15, a fused computation node F100' may be obtained. After the operator fusion is performed on the calculation node A101, the selection node SL12, the selection node SL13, and the selection node SL16, a fused computation node F101 may be obtained.

As shown in FIG. 5A and FIG. 5B, after the operator fusion is performed, the number of operators in the computation graph of the neural network model is reduced. In the example shown in FIG. 5A, the number of operators changes from 8 to 2, and in the example shown in FIG. 5B, the number of operators changes from 9 to 2, thereby reducing the configuration overhead caused by the hardware to start the operators and reducing the configuration time. In addition, data of the six inputs ss1 to ss6 is packed on the host end to obtain one instance input data Inst100, and the instance input data Inst100 can be carried from the host end to the device end at a time, thereby reducing the configuration overhead caused by multiple data carrying (before the operator fusion is performed, data corresponding to each of the inputs ss1 to ss6 needs to be carried once, and therefore six operations of carrying data from the host end to the device end are performed), so that the efficiency of the hardware in reading data can be improved. In addition, through the operator fusion, the number of calculations of the calculation module can be reduced, and the utilization rate of the calculation module can be increased. For example, for 100 pieces of data, 10 pieces of data are calculated each time in the existing manner, and therefore the calculation needs to be performed 10 times. However, after processing is performed based on the data processing method provided in the present disclosure, some operators are fused, so that for example, 20 pieces of data can be calculated each time, and the calculation is performed five times in total. Because the calculation module needs to be configured each time of calculation, the number of configurations in the calculation process can be reduced, and the utilization rate of the calculation module can be increased.

In the embodiments of the present disclosure, all inputs corresponding to the neural network model are packed into one instance input data on the host end, and a start position and an end position of each instance data segment in the instance input data are recorded at the same time. At a graph (computation graph) level, that is, a compilation optimization solution, the calculation node of the initial computation graph of the neural network model and the plurality of corresponding selection nodes are fused into one fused computation node. In addition, node information (that is, {start, size, stride}) of each selection node is recorded in a parameter of the fused computation node. A corresponding execution instruction of the hardware calculation unit is generated based on the parameter of the fused computation node. After the compilation optimization, a large number of selection nodes and calculation nodes are replaced with fused computation nodes, and the number of nodes in the compiled computation graph is reduced.

For example, in some embodiments, the calculation node A100 and the calculation node A101 shown in FIG. 5A may implement an addition calculation. When the fused computation node F100 is calculated, the instance input data Inst100 is first carried from a buffer corresponding to the hardware calculation unit to a memory inside the hardware calculation unit, and then according to inputs required by the calculation node A100 corresponding to the fused computation node F100, that is, outputs of the selection node SL11, the selection node SL14, and the selection node SL15, data segments corresponding to the selection node SL11, the selection node SL14, and the selection node SL15 (that is, a data segment corresponding to the input ss1, a data segment corresponding to the input ss4, and a data segment corresponding to the input ss5) are found from the instance input data Inst100, and then the selection node SL11, the selection node SL14, and the selection node SL15 respectively perform selection operations, and then an accumulation operation is performed on results of the selection operations (that is, an output of the selection node SL11, an output of the selection node SL14, and an output of the selection node SL15). After an operation corresponding to the fused computation node F100 is calculated, a result corresponding to the fused computation node F100 is stored back into the buffer corresponding to the hardware calculation unit. At this time, the instance input data Inst100 is still retained in the memory inside the hardware calculation unit, and then the fused computation node F101 may be calculated continuously. A calculation process of the fused computation node F101 is similar to that of the fused computation node F100, and details of the same parts will not be repeated.

It should be noted that the selection operations respectively performed by the selection node SL11, the selection node SL14, and the selection node SL15 may be performed in parallel.

Before the operator fusion is performed, for the calculation node A100, a data carrying process includes carrying, from the buffer corresponding to the hardware calculation unit, data in the instance input data Inst100 that corresponds to the calculation node F100 to the memory inside the hardware calculation unit, then performing calculation corresponding to the calculation node A100, and finally storing a result corresponding to the calculation node A100 obtained through calculation back into the buffer corresponding to the hardware calculation unit; for the calculation node A101, the data carrying process includes carrying, from the buffer corresponding to the hardware calculation unit, data in the instance input data Inst100 that corresponds to the calculation node F100 to the memory inside the hardware calculation unit, then performing calculation corresponding to the calculation node A101, and finally storing a result corresponding to the calculation node A101 obtained through calculation back into the buffer corresponding to the hardware calculation unit; the number of data carrying is large, and there is a process of repeatedly carrying some data in the instance input data Inst100 from the buffer corresponding to the hardware calculation unit to the memory inside the hardware calculation unit, thereby reducing the execution efficiency of the hardware calculation unit. In addition, for the calculation node A100, the hardware needs to execute a plurality of launch kernels (each selection node corresponds to one launch kernel, and the calculation node A100 corresponds to one launch kernel), and the configuration overhead caused by the hardware to start the operators is large.

After the operator fusion is performed, for the fused computation node F100, a data carrying process includes carrying the instance input data Inst100 from the buffer corresponding to the hardware calculation unit to the memory inside the hardware calculation unit, then performing calculation corresponding to the fused computation node F100, and finally storing a result corresponding to the fused computation node F100 obtained through calculation back into the buffer corresponding to the hardware calculation unit; for the fused computation node F101, because the instance input data Inst100 has been stored in the memory inside the hardware calculation unit, calculation corresponding to the fused computation node F101 may be directly performed at this time, and then a result corresponding to the fused computation node F101 obtained through calculation is stored back into the buffer corresponding to the hardware calculation unit, thereby reducing the number of data carrying, saving the time of data carrying, and reducing the configuration overhead caused by multiple data carrying. In addition, the plurality of nodes are fused into one fused node, so that a plurality of launch kernels corresponding to the plurality of nodes are changed into one launch kernel corresponding to one fused node, thereby reducing the configuration overhead caused by the hardware to start the operators, improving the execution efficiency of the hardware calculation unit, and reducing the configuration time and the overall running time.

Figure 6:
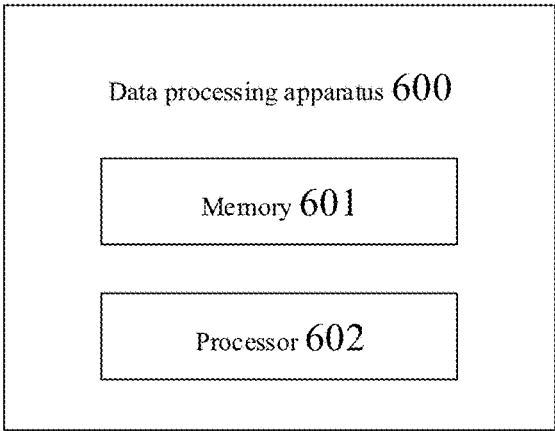
FIG. 6 is a schematic block diagram of a data processing apparatus according to at least one embodiment of the present disclosure.

FIG. 6 is a schematic block diagram of a data processing apparatus according to at least one embodiment of the present disclosure.

At least one embodiment of the present disclosure further provides a data processing apparatus. As shown in FIG. 6, the data processing apparatus 600 may include at least one memory 601 and at least one processor 602. It should be noted that components of the data processing apparatus 600 are merely illustrative and not restrictive. According to actual application requirements, the data processing apparatus 600 may further include other components, which is not specifically limited in the embodiments of the present disclosure.

For example, the at least one memory 601 is configured to store computer-executable instructions in a non-transitory manner; and the at least one processor 602 is configured to run the computer-executable instructions. When the computer-executable instructions are run by the at least one processor 602, one or more steps in the data processing method according to any one of the embodiments of the present disclosure are implemented. For specific implementation of each step of the data processing method and related explanation content, reference may be made to the embodiment of the data processing method, and details of the same parts will not be repeated here.

For example, the memory 601 and the processor 602 may communicate with each other directly or indirectly. For example, in some embodiments, the data processing apparatus 600 may further include a communication interface and a communication bus. The memory 601, the processor 602, and the communication interface may communicate with each other through the communication bus, and components such as the memory 601, the processor 602, and the communication interface may also communicate through a network connection. The network may include a wireless network, a wired network, and/or any combination of a wireless network and a wired network. The present disclosure is not limited to a type and a function of the network.

For example, the communication bus may be a peripheral component interconnect standard (PCI) bus, an extended industry standard architecture (EISA) bus, or the like. The communication bus may be divided into an address bus, a data bus, a control bus, and the like.

For example, the communication interface is configured to implement communication between the data processing apparatus 600 and another device. The communication interface may be a universal serial bus (USB) interface or the like.

For example, the memory 601 and the processor 602 may be disposed at a server end (or a cloud end).

For example, the processor 602 may control another component in the data processing apparatus to perform an expected function. The processor may be a central processing unit (CPU), a graphics processing unit (GPU), a network processor (NP), or the like. The processor may also be another form of processing unit with a data processing capability and/or a program execution capability, for example, a digital signal processor (DSP), an application-specific integrated circuit (ASIC), a field programmable gate array (FPGA), a tensor processing unit (TPU), or another programmable logic device, a discrete gate or transistor logic device, or a discrete hardware component. The central processing unit (CPU) may be an X86 or ARM architecture or the like.

For example, the memory 601 may be a computer-readable medium and may include any combination of one or more computer program products. The computer program products may include various forms of computer-readable storage media, for example, a volatile memory and/or a non-volatile memory. The volatile memory may include, for example, a random access memory (RAM) and/or a cache memory (cache). The non-volatile memory may include, for example, a read-only memory (ROM), a hard disk, an erasable programmable read-only memory (EPROM), a portable compact disk read-only memory (CD-ROM), a USB memory, a flash memory, or the like. One or more computer-readable instructions may be stored in the computer-readable storage medium, and the processor may run the computer-readable instructions to implement various functions of the data processing apparatus 600. Various applications and various data may also be stored in the storage medium.

For the technical effects that can be achieved by the data processing apparatus, reference may be made to related descriptions in the embodiment of the data processing method, and details of the same parts will not be repeated.

Figure 7:
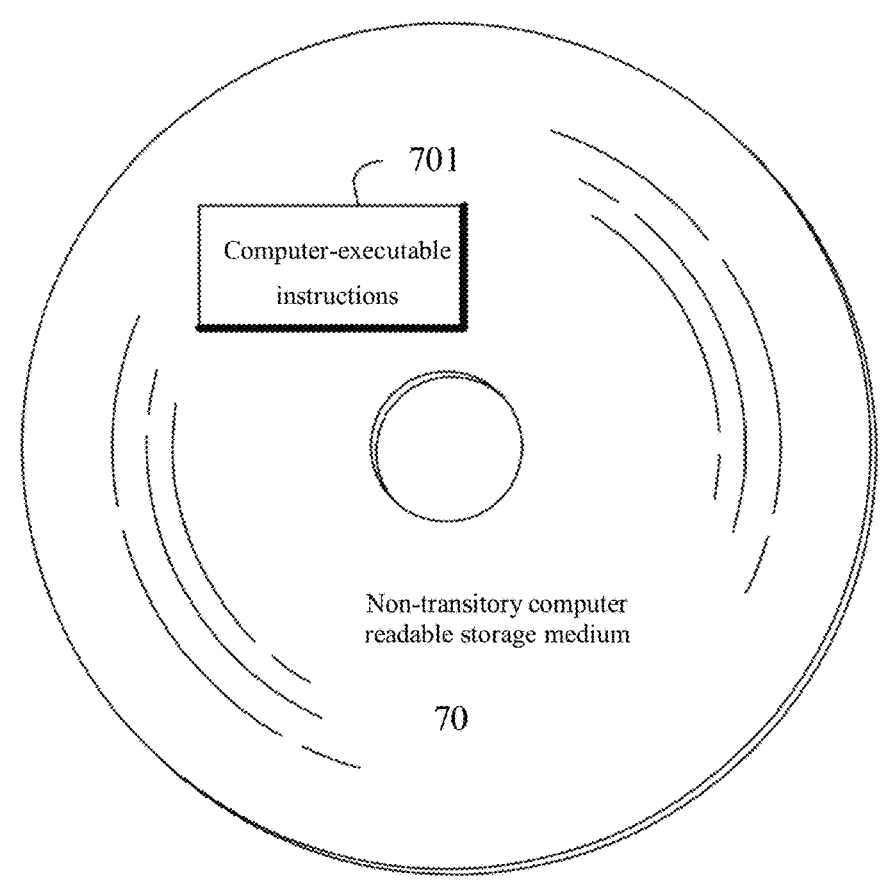
FIG. 7 is a schematic diagram of a non-transitory computer-readable storage medium according to at least one embodiment of the present disclosure.

FIG. 7 is a schematic diagram of a non-transitory computer-readable storage medium according to at least one embodiment of the present disclosure. For example, as shown in FIG. 7, one or more computer-executable instructions 701 may be stored on a non-transitory computer-readable storage medium 70 in a non-transitory manner. For example, when the computer-executable instructions 701 are executed by a processor, one or more steps in the data processing method according to any one of the embodiments of the present disclosure may be performed.

For example, the non-transitory computer-readable storage medium 70 may be applied to the data processing apparatus 600. For example, the non-transitory computer-readable storage medium 70 may include the memory 601 in the data processing apparatus 600.

For example, for a description of the non-transitory computer-readable storage medium 70, reference may be made to the description of the memory 601 in the embodiment of the data processing apparatus 600, and details of the same parts will not be repeated.

Figure 8:
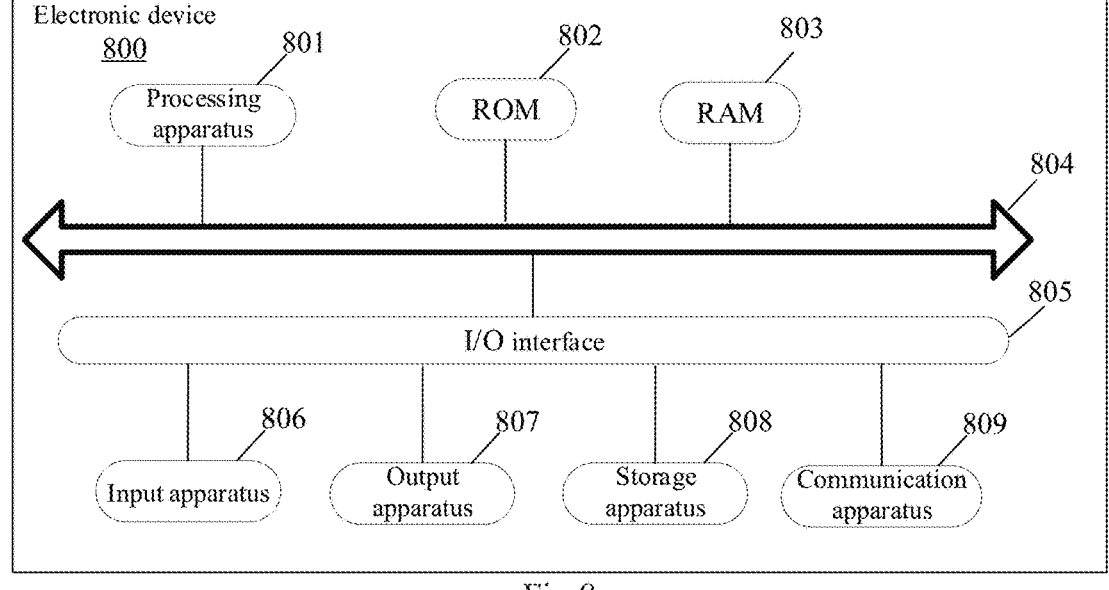
FIG. 8 is a schematic diagram of a hardware structure of an electronic device according to at least one embodiment of the present disclosure.

Reference is made to FIG. 8 below. FIG. 8 is a schematic diagram of a structure of an electronic device 800 suitable for implementing the embodiments of the present disclosure. The electronic device 800 may be a terminal device (for example, a computer) or a processor, and may be used to execute the data processing method in the above embodiments. The electronic device in this embodiment of the present disclosure may include but is not limited to a mobile terminal such as a mobile phone, a notebook computer, a digital broadcast receiver, a personal digital assistant (PDA for short), a tablet computer (Portable Android Device, PAD for short), a portable multimedia player (Portable Media Player, PMP for short), and a vehicle-mounted terminal (for example, a vehicle navigation terminal), and a fixed terminal such as a digital TV and a desktop computer. The electronic device shown in FIG. 8 is merely an example and shall not impose any limitation on the function and scope of use of the embodiments of the present disclosure.

As shown in FIG. 8, the electronic device 800 may include a processing apparatus (for example, a central processing unit, a graphics processing unit, etc.) 801 that may perform various appropriate actions and processing in accordance with a program stored in a read-only memory (ROM) 802 or a program loaded from a storage apparatus 808 into a random access memory (RAM) 803. The RAM 803 further stores various programs and data required for operation of the electronic device 800. The processing apparatus 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806 including, for example, a touchscreen, a touchpad, a keyboard, a mouse, a camera, a microphone, an accelerometer, and a gyroscope; an output apparatus 807 including, for example, a liquid crystal display (LCD), a speaker, and a vibrator; the storage apparatus 808 including, for example, a tape and a hard disk; and a communication apparatus 809. The communication apparatus 809 may allow the electronic device 800 to perform wireless or wired communication with other devices to exchange data. Although FIG. 8 shows the electronic device 800 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowchart, to perform one or more steps of the data processing method described above. In such an embodiment, the computer program may be downloaded from a network through the communication apparatus 809 and installed, installed from the storage apparatus 808, or installed from the ROM 802. When the computer program is executed by the processing apparatus 801, the processing apparatus 801 may be caused to perform the above functions defined in the data processing method of the embodiment of the present disclosure.

It should be noted that in the context of the present disclosure, a computer-readable medium may be a tangible medium that may contain or store a program for use by or in combination with an instruction execution system, apparatus, or device. The computer-readable medium may be a computer-readable signal medium, a computer-readable storage medium, or any combination thereof. The computer-readable storage medium may be, for example but not limited to, electric, magnetic, optical, electromagnetic, infrared, or semiconductor systems, apparatus, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program that can be used by or in combination with an instruction execution system, apparatus, or device. In the present disclosure, the computer-readable signal medium may include a data signal propagated in a baseband or as a part of a carrier, where the computer-readable program code is carried. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium may send, propagate, or transmit a program used by or in combination with an instruction execution system, apparatus, or device. The program code contained in the computer-readable medium may be transmitted by any suitable medium, including but not limited to: electric wires, optical cables, radio frequency (RF), and the like, or any suitable combination of the foregoing media.

The foregoing computer-readable medium may be contained in the foregoing electronic device. Alternatively, the computer-readable medium may exist independently, without being assembled into the electronic device.

The computer program code for performing the operations in the present disclosure may be written in one or more programming languages or a combination thereof, where the programming languages include but are not limited to an object-oriented programming language, such as Java, Small-talk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case involving a remote computer, the remote computer may be connected to a computer of a user over any type of network, including a local area network (LAN) or a wide area network (WAN), or may be connected to an external computer (for example, connected over the Internet using an Internet service provider).

The flowcharts and block diagrams in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations or may be implemented by a combination of dedicated hardware and computer instructions.

The units described in the embodiments of the present disclosure may be implemented by software or may be implemented by hardware. For example, the name of the unit does not constitute a limitation on the unit itself in some cases.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

According to a first aspect, in accordance with one or more embodiments of the present disclosure, a data processing method is applied to a neural network model after compilation processing is performed, where a compiled computation graph corresponding to the neural network model includes M fused computation nodes, M is a positive integer, and the data processing method includes: performing packing processing on data in a plurality of input data groups to obtain at least one instance input data, wherein each instance input data includes at least data required by at least one of the M fused computation nodes when the neural network model performs model inference once; reading one instance input data in the at least one instance input data; executing an execution instruction corresponding to the at least one fused computation node based on the instance input data, to obtain an output of the at least one fused computation node; and outputting the output of the at least one fused computation node.

According to one or more embodiments of the present disclosure, each instance input data includes all data required when the neural network model performs model inference once.

According to one or more embodiments of the present disclosure, each input data group includes a plurality of input data segments, and the plurality of input data segments respectively correspond to a plurality of model inferences performed by the neural network model.

According to one or more embodiments of the present disclosure, each instance input data includes a plurality of data segments, the plurality of data segments are in a one-to-one correspondence with the plurality of input data groups, and each data segment is one input data segment in a corresponding input data group.

According to one or more embodiments of the present disclosure, the packing processing is performed on a host end.

According to one or more embodiments of the present disclosure, the reading one instance input data in the at least one instance input data includes: carrying the at least one instance input data from a memory on the host end to a memory on a device end at the same time; and reading the instance input data from the memory on the device end and writing the instance input data into a memory of a calculation unit that executes the at least one fused computation node.

According to one or more embodiments of the present disclosure, the at least one instance input data includes a plurality of instance input data, and the plurality of instance input data is stored continuously.

According to one or more embodiments of the present disclosure, each instance input data includes a plurality of data segments, and the plurality of data segments in each instance input data are stored continuously.

According to one or more embodiments of the present disclosure, each instance input data includes a plurality of data segments, and the packing processing includes: recording a start position and an end position of each data segment in each instance input data.

According to one or more embodiments of the present disclosure, each fused computation node is configured to implement N selection operations and at least one calculation operation, and each calculation operation is configured to perform calculating on a result of at least one selection operation, where N is a positive integer.

According to one or more embodiments of the present disclosure, each calculation operation includes an addition calculation, a subtraction calculation, a multiplication calculation, a division calculation, or a fully connected calculation.

According to one or more embodiments of the present disclosure, each instance input data includes a plurality of data segments, the N selection operations are in a one-to-one correspondence with N data segments in the plurality of data segments, and each selection operation represents selecting at least some data from a data segment corresponding to the selection operation.

According to one or more embodiments of the present disclosure, before the compilation processing is performed, a computation graph corresponding to the neural network model includes a plurality of selection nodes and a plurality of calculation nodes. For each fused computation node, the fused computation node is a node obtained by performing operator fusion on at least one selection node and at least one calculation node, the fused computation node corresponds to one calculation fusion parameter, the calculation fusion parameter includes node information corresponding to the at least one selection node and node information corresponding to the at least one calculation node, and the node information corresponding to the at least one selection node is stored in a hash mapping manner.

According to one or more embodiments of the present disclosure, node information corresponding to each selection node includes a selection start position, a data selection interval number, and a number of selected data.

According to one or more embodiments of the present disclosure, outputs of the at least one selection node have a same size.

According to one or more embodiments of the present disclosure, the neural network model includes a plurality of inputs, and a number of the plurality of inputs is greater than a predetermined threshold. According to a second aspect, in accordance with one or more embodiments of the present disclosure, a data processing apparatus includes: at least one memory configured to store computer-executable instructions in a non-transitory manner; and at least one processor configured to run the computer-executable instructions, wherein when the computer-executable instructions are run by the at least one processor, the data processing method according to any one of the embodiments of the present disclosure is implemented.

According to a third aspect, in accordance with one or more embodiments of the present disclosure, a non-transitory computer-readable storage medium is provided, wherein the non-transitory computer-readable storage medium stores computer-executable instructions, and when the computer-executable instructions are executed by a processor, the data processing method according to any one of the embodiments of the present disclosure is implemented.

The foregoing descriptions are merely preferred embodiments of the present disclosure and explanations of the applied technical principles. A person skilled in the art should understand that the scope of disclosure involved in the present disclosure is not limited to the technical solution formed by a specific combination of the foregoing technical features, and shall also cover other technical solutions formed by any combination of the foregoing technical features or their equivalent features without departing from the foregoing concept of disclosure. For example, a technical solution formed by replacing the foregoing features with technical features with similar functions disclosed in the present disclosure (but not limited thereto) also falls within the scope of the present disclosure.

In addition, although the operations are depicted in a specific order, it should be understood as requiring these operations to be performed in the specific order shown or in a sequential order. Under certain circumstances, multitasking and parallel processing may be advantageous. Likewise, although several specific implementation details are contained in the foregoing discussions, these details should not be construed as limiting the scope of the present disclosure. Some features described in the context of separate embodiments can also be implemented in combination in a single embodiment. In contrast, various features described in the context of a single embodiment can also be implemented in a plurality of embodiments individually or in any suitable sub-combination.

Although the subject matter has been described in a language specific to structural features and/or logical actions of the method, it should be understood that the subject matter defined in the appended claims is not necessarily limited to the specific features or actions described above. On the contrary, the specific features and actions described above are merely exemplary forms of implementing the claims.

The following points need to be noted for the present disclosure:

(1) The accompanying drawings of the embodiments of the present disclosure only involve the structure related to the embodiments of the present disclosure, and other structures may refer to a conventional design.

(2) When there is no conflict, the embodiments of the present disclosure and the features in the embodiments may be combined with each other to obtain new embodiments.

The foregoing descriptions are merely specific implementations of the present disclosure, but the scope of protection of the present disclosure is not limited thereto, and the scope of protection of the present disclosure shall be subject to the scope of protection of the claims.

The invention claimed is:

1. A data processing method, applied to a neural network model after compilation processing is performed, where a compiled computation graph corresponding to the neural network model comprises M fused computation nodes, M is a positive integer, and the data processing method comprises:

performing packing processing on data in a plurality of input data groups to obtain at least one instance input data at a host end, wherein each instance input data comprises at least data required by a plurality of fused computation nodes of the M fused computation nodes when the neural network model performs model inference once;

reading one instance input data in the at least one instance input data;

executing an execution instruction corresponding to the plurality of fused computation nodes based on the instance input data, to obtain an output of the plurality of fused computation nodes; and outputting the output of the plurality of fused computation nodes, the reading one instance input data in the at least one instance input data comprises:

accessing a memory on the host end to read the at least one instance input data from the memory on the host end and carry the at least one instance input data to a memory on a device end at the same time; and accessing the memory of the device to read the instance input data from the memory on the device end and write the instance input data into a memory of a calculation unit that executes the plurality of fused computation nodes.

2. The data processing method according to claim 1, wherein each instance input data comprises all data required when the neural network model performs model inference once.

3. The data processing method according to claim 2, wherein the packing processing is performed on a host end.

4. The data processing method according to claim 2, wherein the at least one instance input data comprises a plurality of instance input data, and the plurality of instance input data is stored continuously.

5. The data processing method according to claim 1, wherein the at least one instance input data comprises a plurality of instance input data, and the plurality of instance input data is stored continuously.

6. The data processing method according to claim 1, wherein each instance input data comprises a plurality of instance data segments, and the plurality of instance data segments in each instance input data are stored continuously.

7. The data processing method according to claim 1, wherein each instance input data comprises a plurality of instance data segments, and the packing processing comprises: recording a start position and an end position of each instance data segment in each instance input data.

8. The data processing method according to claim 1, wherein each input data group comprises a plurality of input data segments, and the plurality of input data segments respectively correspond to a plurality of model inferences performed by the neural network model.

9. The data processing method according to claim 8, wherein each instance input data comprises a plurality of instance data segments, the plurality of instance data segments are in a one-to-one correspondence with the plurality of input data groups, and each instance data segment is one input data segment in a corresponding input data group.

10. The data processing method according to claim 1, wherein each fused computation node is configured to implement N selection operations and at least one calculation operation, and each calculation operation is configured to perform calculating on a result of at least one selection operation, where N is a positive integer.

11. The data processing method according to claim 10, wherein each calculation operation comprises an addition calculation, a subtraction calculation, a multiplication calculation, a division calculation, or a fully connected calculation.

12. The data processing method according to claim 10, wherein each instance input data comprises a plurality of data segments, the N selection operations are in a one-to-one correspondence with N data segments in the plurality of data segments, and each selection operation represents selecting at least some data from a data segment corresponding to the selection operation.

13. The data processing method according to claim 1, wherein before the compilation processing is performed, a computation graph corresponding to the neural network model comprises a plurality of selection nodes and a plurality of calculation nodes, for each fused computation node, the fused computation node is a node obtained by performing operator fusion on at least one selection node and at least one calculation node, the fused computation node corresponds to one calculation fusion parameter, the calculation fusion parameter comprises node information corresponding to the at least one selection node and node information corresponding to the at least one calculation node, and the node information corresponding to the at least one selection node is stored in a hash mapping manner.

14. The data processing method according to claim 13, wherein node information corresponding to each selection node comprises a selection start position, a data selection interval number, and a number of selected data.

15. The data processing method according to claim 13, wherein outputs of the at least one selection node have a same size.

16. The data processing method according to claim 1, wherein the neural network model comprises a plurality of inputs, and a number of the plurality of inputs is greater than a predetermined threshold.

17. An electronic device, comprising:

at least one memory, configured to store computer-executable instructions in a non-transitory manner; and at least one processor, configured to run the computer-executable instructions, wherein the computer-executable instructions, when run by the at least one processor, cause the at least one processor to implement a data processing method, which is applied to a neural network model after compilation processing is performed, where a compiled computation graph corresponding to the neural network model comprises M fused computation nodes, M is a positive integer, and the data processing method comprises:

performing packing processing on data in a plurality of input data groups to obtain at least one instance input data at a host end, wherein each instance input data comprises at least data required by a plurality of fused computation nodes of the M fused computation nodes when the neural network model performs model inference once;

reading one instance input data in the at least one instance input data;

executing an execution instruction corresponding to the plurality of fused computation nodes based on the instance input data, to obtain an output of the plurality of fused computation nodes; and outputting the output of the plurality of fused computation nodes, the reading one instance input data in the at least one instance input data comprises:

accessing a memory on the host end to read the at least one instance input data from the memory on the host end and carry the at least one instance input data to a memory on a device end at the same time; and accessing the memory of the device to read the instance input data from the memory on the device end and write the instance input data into a memory of a calculation unit that executes the plurality of fused computation nodes.

18. The electronic device according to claim 17, wherein each instance input data comprises all data required when the neural network model performs model inference once.

19. The electronic device according to claim 17, wherein the at least one instance input data comprises a plurality of instance input data, and the plurality of instance input data is stored continuously.

20. A non-transitory computer-readable storage medium storing computer-executable instructions, wherein the computer-executable instructions, when executed by a processor, perform a data processing method, which is applied to a neural network model after compilation processing is performed, where a compiled computation graph corresponding to the neural network model comprises M fused computation nodes, M is a positive integer, and the data processing method comprises:

performing packing processing on data in a plurality of input data groups to obtain at least one instance input data at a host end, wherein each instance input data comprises at least data required by a plurality of fused computation nodes of the M fused computation nodes when the neural network model performs model inference once;

reading one instance input data in the at least one instance input data;

executing an execution instruction corresponding to the plurality of fused computation nodes based on the instance input data, to obtain an output of the plurality of fused computation nodes; and outputting the output of the plurality of fused computation nodes, the reading one instance input data in the at least one instance input data comprises:

accessing a memory on the host end to read the at least one instance input data from the memory on the host end and carry the at least one instance input data to a memory on a device end at the same time; and accessing the memory of the device to read the instance input data from the memory on the device end and write the instance input data into a memory of a calculation unit that executes the plurality of fused computation nodes.

* * * * *